United States Patent
Brunner et al.

(10) Patent No.: US 7,581,781 B2
(45) Date of Patent: Sep. 1, 2009

(54) DEVICE FOR ABSORBING LATERAL FORCES DURING A SIDE IMPACT OF A MOTOR VEHICLE

(75) Inventors: Markus Brunner, Pliezhausen (DE); Stephan Brausse, Eningen (DE); Franc Praznik, Leonberg (DE); Roberto Oggianu, Leonberg (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 249 days.

(21) Appl. No.: 11/588,234

(22) Filed: Oct. 27, 2006

(65) Prior Publication Data

US 2007/0096507 A1  May 3, 2007

(30) Foreign Application Priority Data

Oct. 29, 2005  (DE)  ........................ 10 2005 051 947

(51) Int. Cl.
*B60N 99/00* (2006.01)
(52) U.S. Cl. .............................. 296/187.03; 296/193.05
(58) Field of Classification Search ............ 296/187.03, 296/187.08, 187.11, 187.12, 193.05, 193.07, 296/193.08, 203.01
See application file for complete search history.

(56) References Cited

U.S. PATENT DOCUMENTS 2,647,791 A    8/1953   Barenyl
5,954,390 A    9/1999   Kleinhoffer et al.
6,168,228 B1 *  1/2001   Heinz et al. ............ 296/187.12

FOREIGN PATENT DOCUMENTS

| DE | 689 11 428 T2 | 6/1994 |
|----|----|----|
| DE | 198 11 215 A1 | 9/1999 |
| DE | 199 43 296 A1 | 3/2001 |
| DE | 102 41 600 A1 | 4/2003 |
| EP | 0 546 671 A1 | 6/1993 |
| EP | 0 357 225 B1 | 12/1993 |
| EP | 0 943 530 B1 | 8/2004 |
| EP | 1 586 494 A2 | 10/2005 |
| GB | 2 379 638 A | 3/2003 |
| JP | 10-218038 A | 8/1998 |
| JP | 2002-362415 A | 12/2002 |

OTHER PUBLICATIONS

European Search Report dated Feb. 20, 2007 with English translation (four (4) pages).

* cited by examiner

*Primary Examiner*—Lori L Lyjak
(74) *Attorney, Agent, or Firm*—Gerald E. Hespos; Anthony J. Casella

(57) ABSTRACT

For the effective absorption of a side impact in a motor vehicle, a transversely extending component is provided in the vehicle that comprises a bearing element and profile parts situated on the ends thereof.

16 Claims, 5 Drawing Sheets

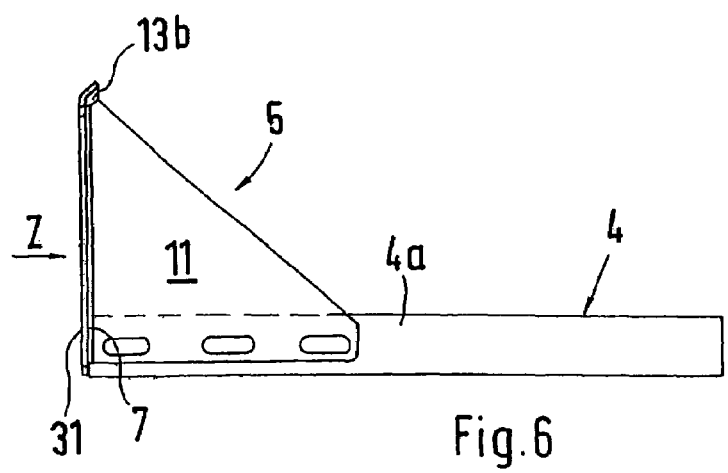
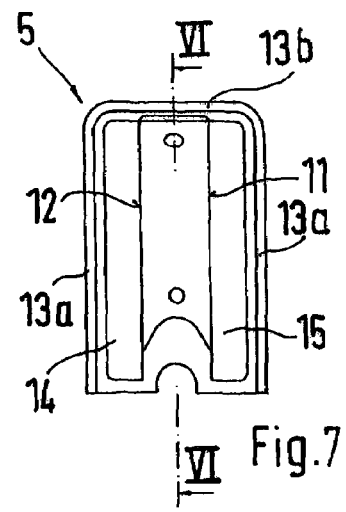
Fig. 6
Fig. 7
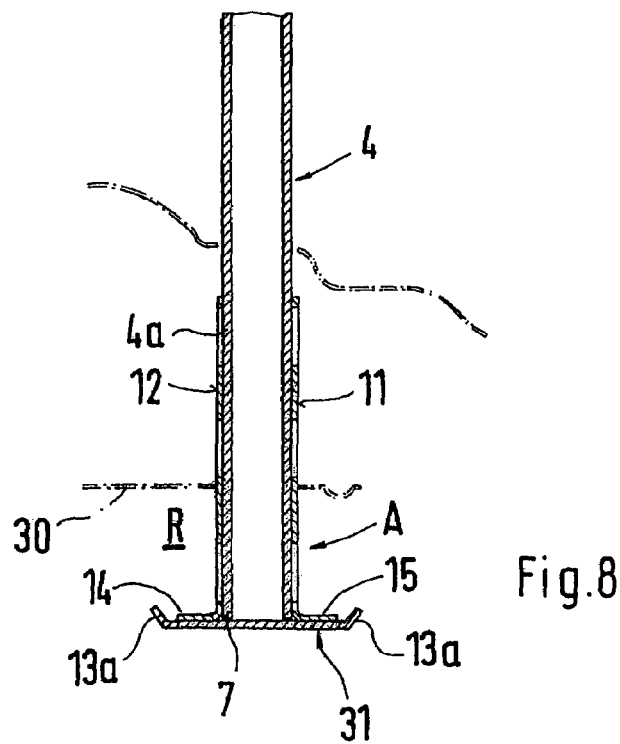
Fig. 8

DEVICE FOR ABSORBING LATERAL FORCES DURING A SIDE IMPACT OF A MOTOR VEHICLE

RELATED APPLICATIONS

This application claims priority to German Patent Application serial number 10 2005 051 947.4, filed Oct. 29, 2005, the contents of which are incorporated by reference herein.

BACKGROUND AND SUMMARY OF THE INVENTION

The present invention relates to a device for absorbing lateral forces during a side impact of a motor vehicle.

EP 0 943 530 B1 discloses a vehicle having a device for absorbing lateral forces during a side impact by way of a transverse bracing component. This component has a tubular design with two lateral exterior, upright reinforcement pipes and a tubular reinforcing element extending over the width of the vehicle body. The upright reinforcement pipes are connected to junction plates incorporated in the vehicle structure.

An object of the present invention is to provide a device in a motor vehicle for side impact protection, i.e., for the absorption of lateral forces, that ensures optimum absorption of these lateral forces and allows precise positioning during assembly, thereby permitting targeted introduction of force into the vehicle structure and achieving optimum occupant protection.

This object has been achieved according to the invention by providing that, for a side impact, i.e., when lateral forces impinge on a vehicle in the region of a B-pillar or a region of the vehicle body located behind a door opening, the vehicle is provided with additional reinforcement in this region so that the occupants are protected during a collision or the like, and this region of the vehicle body cannot be inwardly deformed to the extent that could injure the occupants. This is achieved by the supporting element being composed of a profile part that projects upward in a vertical plane from a transversely extending bearing element and that may be attached to the bearing element via associated fastening sections.

The profile part is also passed through and mounted in a bracket that is fixed to the vehicle body. A free-standing area of the profile part together with the bearing element is situated in the pillar space so as to protrude from the bracket. An end face region of the profile part is provided with a plate, referred to as an impact plate, that is connected to upright legs of the profile part. The impact plate may be rounded on the side edges and the top edge so that these are guided over the edges of the legs.

The present invention provides in particular that the profile part has a box-shaped configuration comprising two side flanks that are connected by a bar and separated at a distance opposite from one another, and the horizontally running fastening sections are respectively positioned on the side flanks and accommodate the bearing element therebetween. This structure of the profile part allows lateral impact forces to be optimally transmitted to the transversely extending bearing element, that may be designed as a pipe or as a plate girder having any geometric shape.

The profile part is fastened to the transversely extending bearing element by at least one relatively long fastening section to avoid being pulled off. The present invention in particular provides that the profile part on its side flanks has legs that extend down in a vertical plane and are connected to the plate which is directly associated with an outer side wall of the vehicle.

The profile part is attached by its fastening sections to a wall of the bearing part, and a lower boundary of the fastening sections is situated at least in the region between a lower boundary plane and an upper boundary plane of the bearing part lying thereabove. To keep the profile part from projecting underneath the bearing element, which could result in an adverse deformation effect on the transversely extending bearing element, the profile part is fastened at its horizontally running fastening sections to the end pipe section in at least one center pipe transverse plane or below same. The edge faces of the profile part lead out over the center pipe transverse plane and end in front of a lower pipe transverse plane that borders the pipe, i.e., the bearing element, from below. As a result, no region of the profile part extends underneath the bearing element, thus ensuring that only an upwardly extending lever arm results from the vertical profile part, and the bearing element is correspondingly deformed with absorption of energy, guaranteeing a survival space up to a certain magnitude of the lateral force.

The bearing element comprises a transversely extending pipe, and one end pipe section on each side of the vehicle is connected to the profile part, and a further adjacent, transversely extending center pipe section is connected to each end pipe section via a sliding sleeve. The cross section of the pipe for the bearing element may be polygonal, circular, ellipsoidal, or the like. The bearing element may also be integrated into the underbody of the vehicle as a beam, or may be set in place as a welded or riveted beam.

To enable the lateral forces to be optimally absorbed during the specified test for side impact, the present invention further provides that the profile part is held in position by the bracket on the vehicle structure is mounted above a vehicle sill and at a distance from an outer side wall of the vehicle structure, and the bracket is connected to a shaped sheet metal part that forms a sill and is also connected to a wall of the vehicle structure.

For adapting to a vehicle having a central tunnel, the present invention provides that the center pipe section has a trapezoidal region that overlaps a central tunnel of the vehicle structure. The adjacent, transversely extending pipe sections are situated lower and run coaxially with respect to the end pipe sections. When subjected to a lateral force that is to be absorbed, the transversely extending pipe sections or bearing element sections can be partially supported on the central tunnel via the trapezoidal region, thus preventing the transversely extending bearing element together with a profile part from breaking through to the other side of the vehicle.

BRIEF DESCRIPTION OF THE DRAWINGS

An embodiment of the present invention is described in greater detail on the basis of the drawings, in which:

FIG. 6 is a side view of the supporting element with a connected bearing element;

FIG. 7 is an end a view of the device together with the supporting element and bearing element, seen in the direction of arrow Z in FIG. 6; and FIG. 8 is a horizontal section view of the device shown FIG. 1.

DETAILED DESCRIPTION OF THE DRAWINGS

Figure 1:
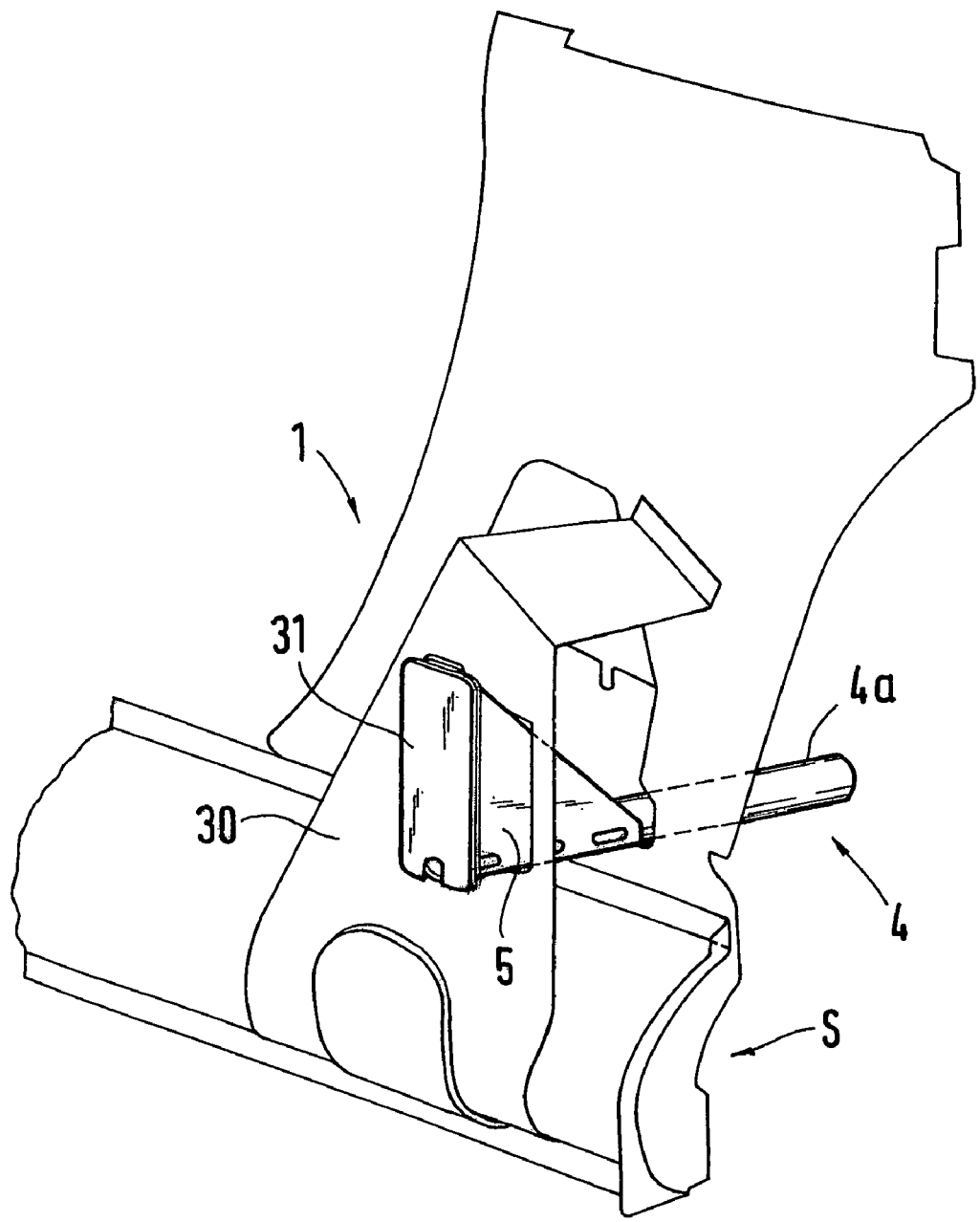
FIG. 1 is a partial perspective view of the device, showing a side impact component having a supporting element and bearing part as well as a retaining bracket, as seen from the outside.
Figure 2:
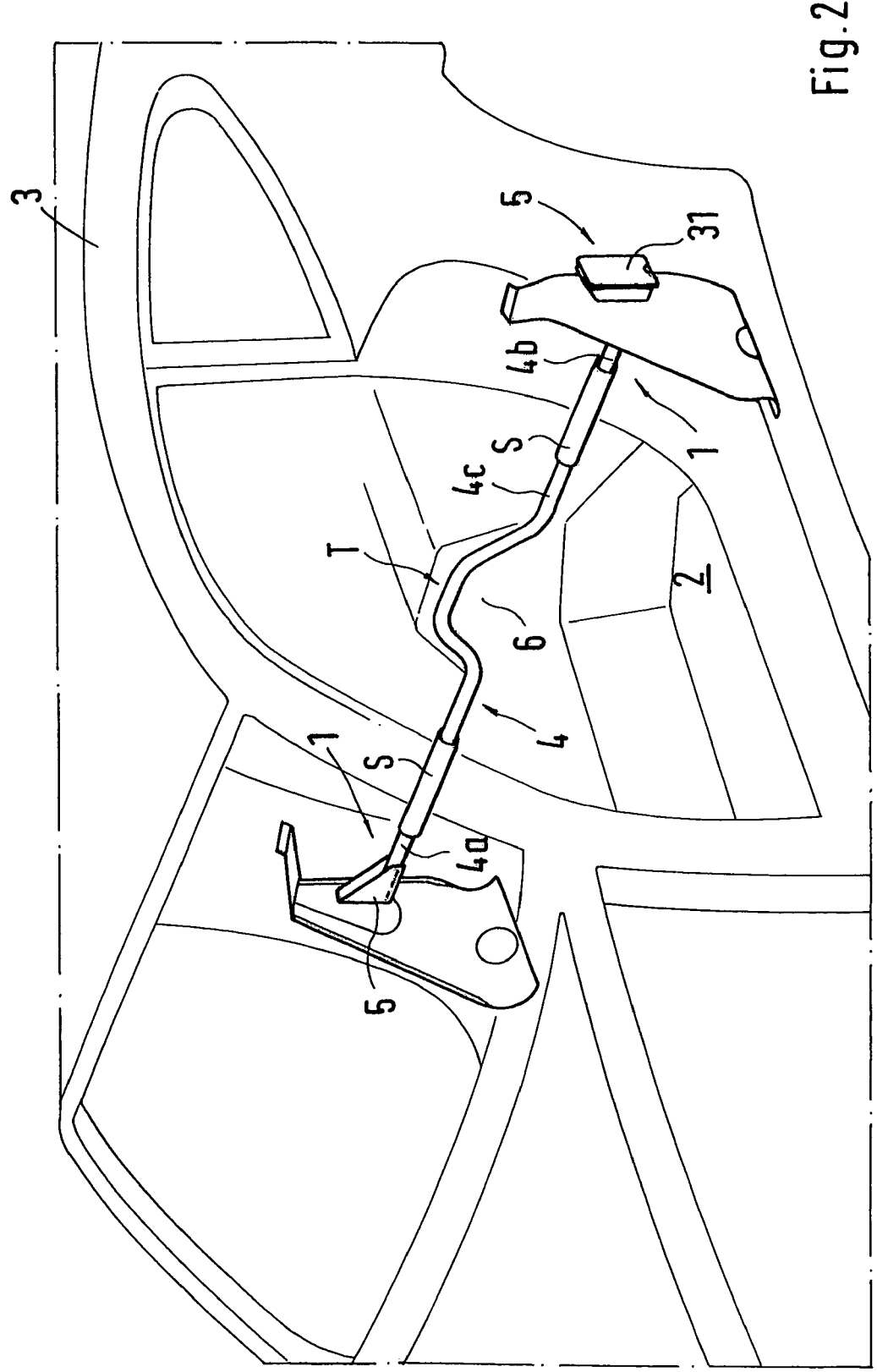
FIG. 2 is a partial, perspective view of the device in the vehicle.

A device designated generally by numeral 1 for absorbing side impact forces in the arrow directions A (the force direction being only symbolically represented in FIG. 3) essentially comprises in the vehicle structure 2 a bearing element 4 extending transversely in the vehicle 3 and a profile part 5 connected thereto which is fastened to each end of the bearing element 4. The bearing element 4 may be fastened to the vehicle floor and may have a configuration that is adapted to the floor, in particular over the central tunnel 6 thereof, for which purpose the bearing element 4 has a corresponding configuration with a trapezoidal projection T as seen in FIG. 2.

The device 1 is constructed in such a way that during a side impact at a specified force a survival space remains for the occupants. In other words, the device 1 preferably is provided in the region of a B-pillar or in a corresponding region of the motor vehicle that does not absolutely have to be a distinct B-pillar.

In the embodiment illustrated, the bearing element 4 is a pipe having a circular cross section. Also contemplated are bearing elements 4 comprising pipes having a polygonal shape or other geometric cross sections, such as ellipsoidal shapes or the like. The bearing element 4 may also be composed of sheet metal sections that form a plate girder comprising an open or closed profile. Energy-absorbing corrugated pipes and the like are also contemplated within the scope of the invention.

The profile part 5 of the device comprises a supporting element 1 that projects only in the upward direction from the transversely extending bearing element 4 and which adjoins each free end 7 of the bearing element 4. A connection to the bearing element 4 is made via a horizontal fastening section 8 on the profile part 5 as seen in FIG. 4. The device 1 is held in position in the vehicle 3 by a bracket 30 fixed to the vehicle body that may be a component of the structure 2 of the vehicle 3. Both the bearing element 4 and the profile part 5 project through an opening 32 in the bracket 30, as illustrated in FIG. 3 and the protruding section is situated in the space R (in FIG. 5) in the vehicle structure 2 in a freely projecting manner.

Figure 3:
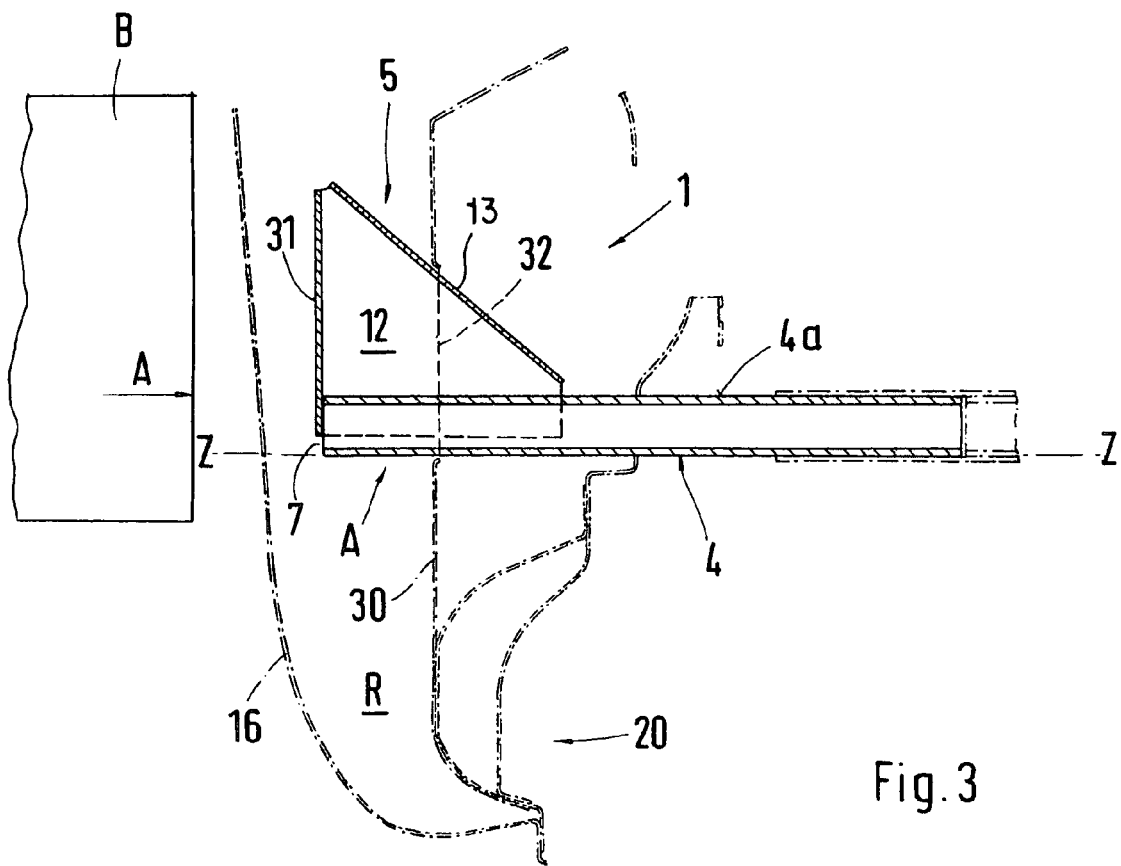
FIG. 3 is a vertical section of the device shown in FIG. 2 in the vehicle.
Figure 4:
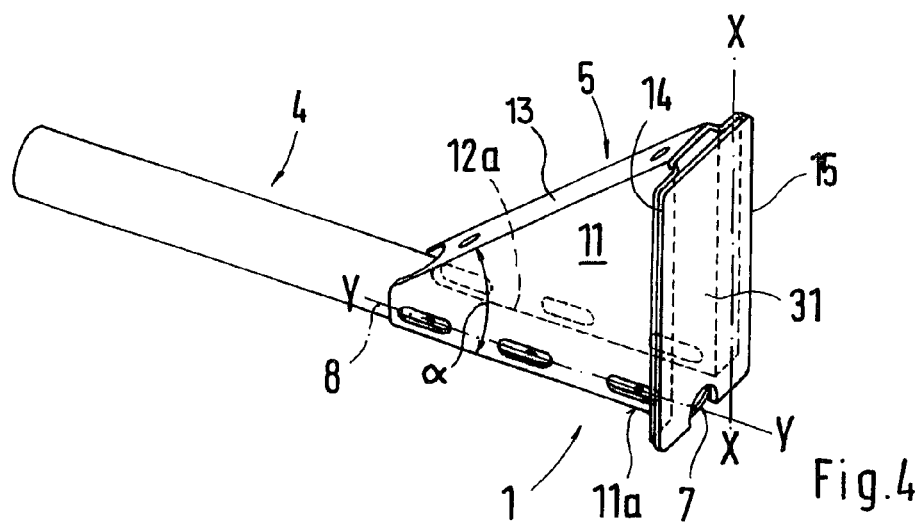
FIG. 4 is a perspective view of the supporting element with a connected bearing element.
Figure 5:
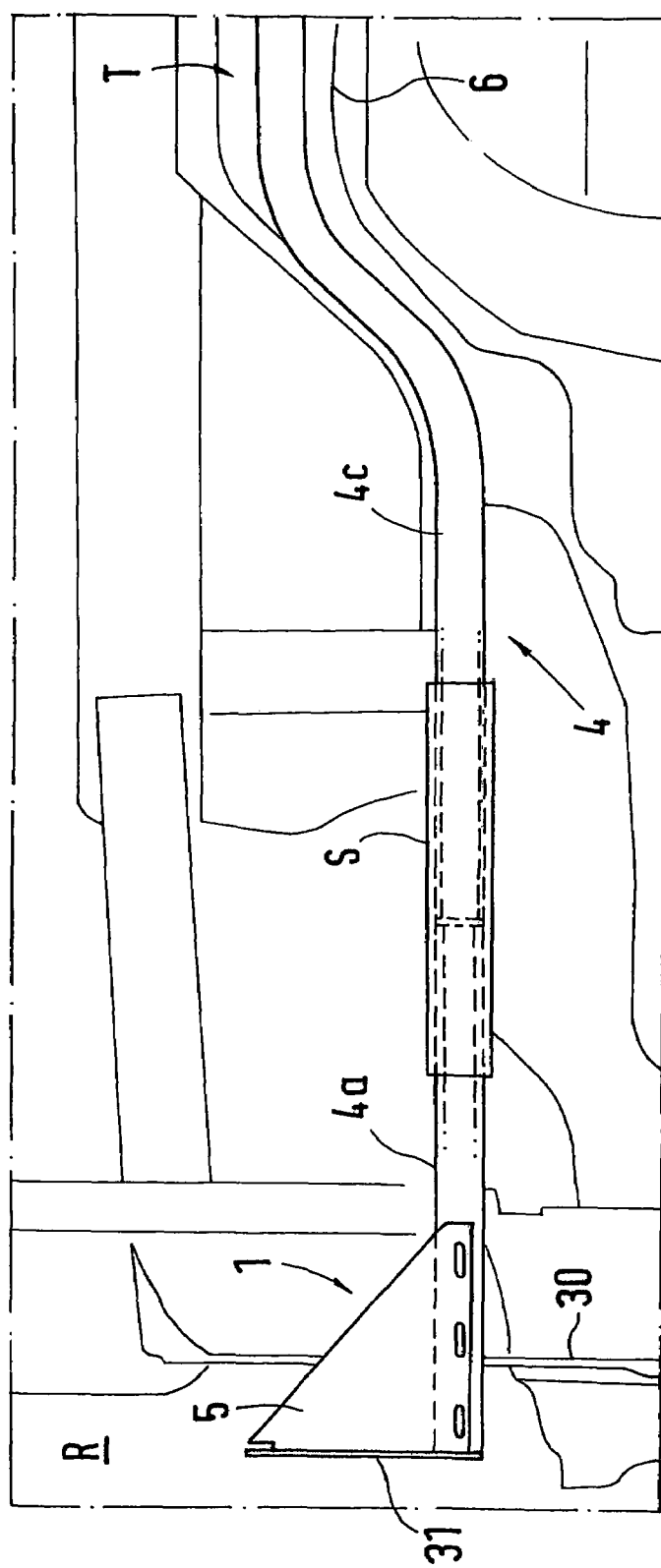
FIG. 5 is a partial side view of the device according to FIG. 2.

As seen in FIGS. 3 and 4, the profile part 5 has an approximately box-shaped configuration and comprises two side flanks 11, 12 separated by a distance from one another and which on the head side are mutually connected via a bar. The profile part 5 has a triangular shape as viewed from the side, and the bar 13 runs at an angle, continuing to the bearing element 4, as shown in greater detail in FIG. 4.

The side flanks 11, 12 of the profile part 5 peripherally enclose the bearing element 4 from the outside, which in the embodiment shown is illustrated by a pipe, and the side flanks 11, 12 are connected to the pipe 4 via the fastening sections 8, running in a horizontal plane X-X, by welding or similar methods. Legs 14, 15 which extend down from the side flanks 11, 12 are situated on an end face of the profile part 5, and are provided in a vertical plane Y-Y which is fixedly connected to the plate 31 which forms an impact plate. This plate 31 may be rounded on the side edges 13*a* and top edge 13*b* as seen in FIGS. 6, 7 and 8 so that the rounding is guided around the edges of the legs 14, 15. The bracket 30 is configured as a sheet metal part aligned in the longitudinal direction of the vehicle, and is positioned in the transverse direction of the vehicle at a distance from the outer side wall 16 of the vehicle 3.

The side flanks 11, 12 end with their lower edges 11*a*, 12*a* either in front of or in a lower boundary plane Z-Z of the bearing element 4, i.e., the pipe, or thereabove (as seen in FIG. 3).

The fastening section 8 and the legs 14, 15 are situated approximately at right angles to one another, thus enabling an optimum absorption of force during a side impact. In FIG. 3 a barrier B is indicated which simulates a side impact on the vehicle 3.

In the embodiment shown, the bearing element 4 in the form of a pipe is subdivided for assembly. Thus, end pipe sections 4*a*, 4*b* are connected to the profile part 5 on each side of the vehicle. A center pipe section 4*c* of the device 1 is fixedly connected to each of the end pipe sections 4*a*, 4*b* by a sliding sleeve S. After a side part of the vehicle is assembled, this sliding sleeve is pushed over the end pipe sections 4*a*, 4*b* to another area of the vehicle structure and welded.

As illustrated in greater detail in FIG. 3, the device 1 together with the profile part 5 and the bearing element 4 is situated above a sill 20 of the vehicle. The bracket 30 is mounted on the sill 20 and on a wall of the vehicle structure 2. The center pipe section 4*c* overlaps the central tunnel 6 of the vehicle structure 2, and in this region has an approximately trapezoidal shape, and the adjoining regions of the pipe section, in particular 4*a* and 4*b*, as well as regions of the center pipe section 4*c* are situated lower and run coaxially with respect to the end pipe sections 4*a* and 4*b*.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Device for absorbing lateral forces during a side impact of a motor vehicle body in a transverse direction of the motor vehicle body, comprising a transverse bracing component in the motor vehicle body that includes a transversely extending bearing element having opposite left and right ends and supporting elements connected respectively to each end thereof in a region of a B-pillar or a corresponding region of the motor vehicle body, wherein each of the supporting elements is a profile part that projects upward in a vertical plane from sections of the transversely extending bearing element adjacent the respective end thereof and is passed through and mounted in a bracket fixed to the motor vehicle body, each of the supporting elements including horizontal fastening sections operatively associated with the bearing element such that the respective profile part is fastenable to the bearing element, and a free-standing area of each of the profile parts is situated in a pillar space or in a space in a region of the motor vehicle body and projects from the bracket at a distance from an outer side wall of vehicle structure, first and second impact plates covering at least parts of the respective first and second ends of the bearing element and being secured to the respective supporting element at locations between the respective bracket and the respective outer side wall of the vehicle structure.

2. Device according to claim 1, wherein the profile part has an approximately box-shaped configuration and comprises two side flanks connected by a connecting bar and separated at a distance opposite from one another, and the fastening sections are respectively positioned on side flanks to accommodate the bearing element therebetween.

3. Device according to claim 2, wherein the profile part on end faces of the side flanks has legs that extend in a vertical plane and that are operatively connected to the impact plate covering the end faces of the respective profile part and associated with the outer side wall, with side edges and a top edge of the plate having a location which is one of i) lying in a plane with the plate and ii) being arranged at an angle.

4. Device according to claim 1, wherein the profile part is operatively attached by the horizontal fastening sections to a wall of the bearing part, and a lower boundary of the horizontal fastening sections is situated at least in the region between a lower boundary plane and an upper boundary plane of the bearing part lying thereabove.

5. Device according to claim 2, wherein the profile part is a shaped sheet metal part and has a U profile-shaped cross section, and the horizontal fastening sections and the extended legs of the side flanks are situated approximately at right angles to one another, and the connecting bar between the two side flanks extends at an acute angle with respect to the adjacent fastening sections.

6. Device according to claim 1, wherein the profile part is operatively fastened by the horizontally running fastening sections to an end pipe section of the bearing element at least in or near a pipe central transverse plane, end edges of the profile part being guided over the pipe central transverse plane and ending in front of a lower boundary plane.

7. Device according to claim 1, wherein the bearing element comprises a pipe, and one end pipe section on each side of the motor vehicle body is connected to the profile part, and a further adjacent, transversely extending center pipe section is connected to each end pipe section via a sliding sleeve.

8. Device according to claim 1, wherein the two profile parts are connected to the bearing element via the bracket and are each mounted above a vehicle sill at a distance from an outer side wall of the vehicle structure.

9. Device according to claim 8, wherein the bracket is operatively connected to a shaped sheet metal part forming the sill and to a wall of the vehicle structure.

10. Device according to claim 9, wherein a center pipe section has a trapezoidal region overlapping a central tunnel of the vehicle structure, and adjacent, transversely extending pipe sections as well as the pipe sections adjoining the trapezoidal region are situated in a lower plane and run coaxially with respect to the end pipe sections.

11. Device for absorbing lateral forces during a side impact of a motor vehicle body in a transverse direction of the motor vehicle body, comprising a transverse bracing component in the motor vehicle body that includes a transversely extending bearing element having opposite left and right ends, left and right profile parts, each of the profile parts having front and rear flanks connected respectively to opposite front and rear surfaces of the transversely extending bearing element along regions adjacent the respective left and right ends thereof, each of the profile parts further including front and rear legs extending respectively from the front and rear flanks of the respective profile part, the front and rear legs of each of said profile parts extending in a substantially vertical plane and being aligned substantially with the respective end of the transversely extending bearing element, each of the profile parts further including a connecting bar extending between the respective front and rear flanks at positions above the transversely extending bearing element, and left and right impact plates covering at least parts of the respective left and right ends of the transversely extending bearing element and joined to the respective legs of the profile part.

12. Device according to claim 11, wherein the connecting bar of each of said profile parts is aligned at an angle to the transversely extending bearing element so that the connecting bar approaches the transversely extending bearing element at locations spaced farther inwardly from the respective left and right ends of the transversely extending bearing element.

13. Device according to claim 12, wherein each of the flanks is substantially triangular.

14. Device according to claim 11, wherein portions of the transversely extending bearing element adjacent the respective left and right ends are aligned substantially normal to the impact plates.

15. Device according to claim 11, wherein each of the flanks and each of the connecting bars of the profile parts extend through holes in brackets fixed to the motor vehicle body so that the respective impact plates and portions of the profile part connected thereto are between the respective bracket and an outer side wall of the motor vehicle body outward of the bracket, portions of the respective profile parts between the bracket and the outer side wall of the motor vehicle body being cross-sectionally larger than the through hole in the bracket.

16. Device according to claim 15, wherein a surface area of the connecting bar of each profile part abuts against an edge region of the through hole in the respective bracket.

\* \* \* \* \*